Oct. 20, 1959
C. F. JONES
2,908,940
APPARATUS FOR RESHAPING CONDUITS
Filed July 26, 1954
2 Sheets-Sheet 1
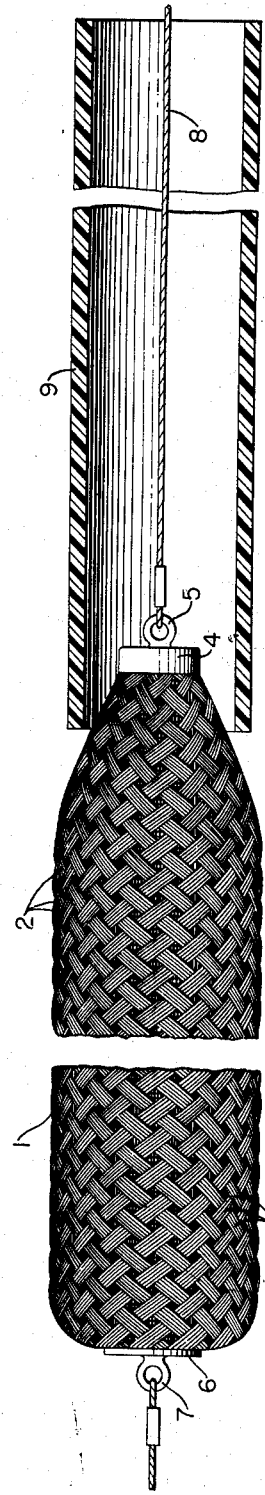
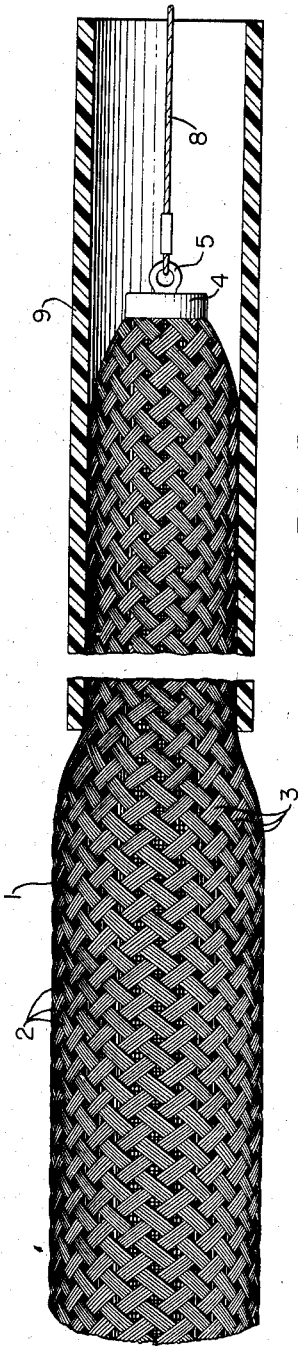
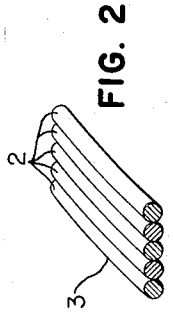
INVENTOR.
CHARLES F. JONES
BY
R. L. Miller
ATTORNEY Oct. 20, 1959 — C. F. JONES — 2,908,940
APPARATUS FOR RESHAPING CONDUITS
Filed July 26, 1954 — 2 Sheets-Sheet 2
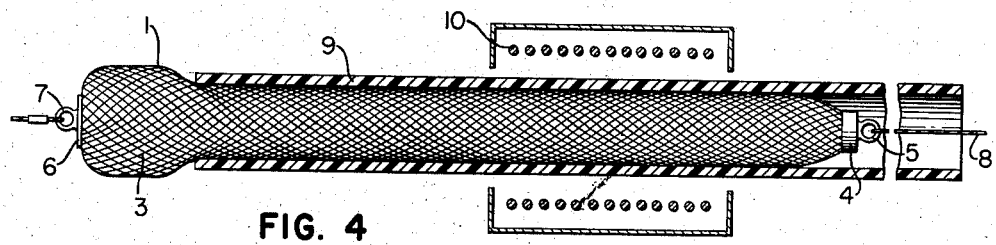
FIG. 4
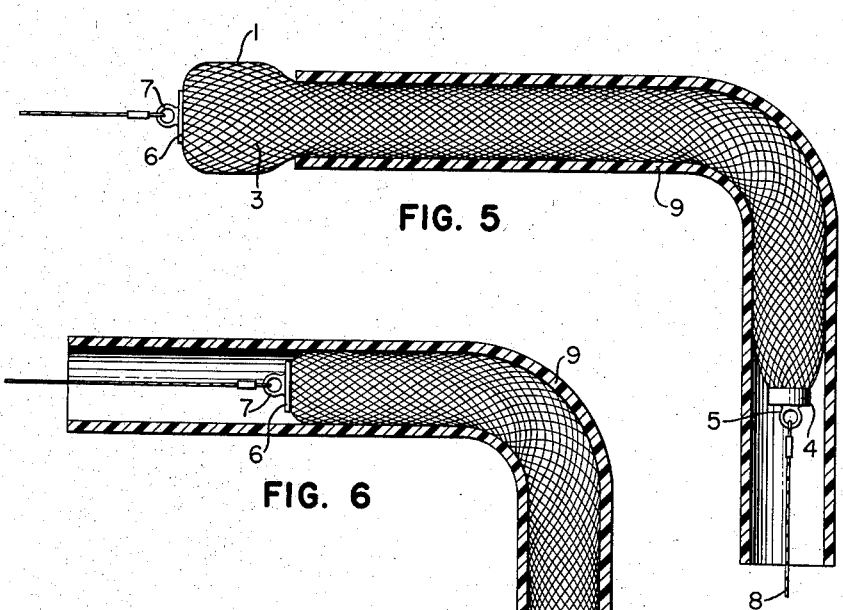
FIG. 5
FIG. 6
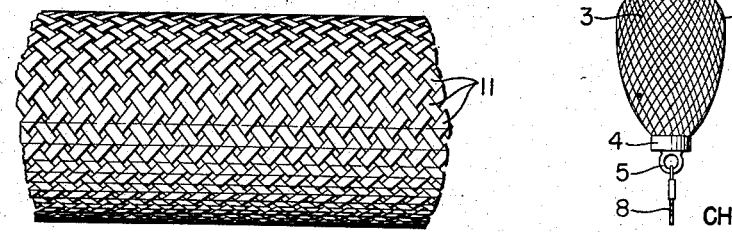
FIG. 7
INVENTOR.
CHARLES F. JONES
BY
R. L. Miller
ATTORNEY

United States Patent Office 2,908,940
Patented Oct. 20, 1959

2,908,940
APPARATUS FOR RESHAPING CONDUITS
Charles F. Jones, East Akron, Ohio, assignor to The Goodyear Tire & Rubber Company, Akron, Ohio, a corporation of Ohio
Application July 26, 1954, Serial No. 445,839
4 Claims. (Cl. 18—45)

This invention relates generally to an apparatus for reshaping a conduit and more particularly to an apparatus wherein the conduit is internally supported during the reshaping operation.

It is frequently required that conduit such as straight lengths of tube, pipe, etc., be reshaped by an operation such as bending to redirect the axial direction of flow therein. The method of performing the reshaping operation varies dependent on the material utilized in the conduit construction. For conduits formed of thermoplastic heat-shapable materials, such as heat-softenable vinyl resins, polyethylene resins, glycol-polybasic acid resins, etc., that portion of the conduit whereat the reshaping operation is to be performed is customarily heated and the conduit reshaped while the material is in a deformable state. Conduits formed of ductile materials such as lead, copper, and the like, generally do not require heating and are deformable in the cold state. However, in all the above materials, if the conduit is not internally supported, crimping at the bend, wall distortion, and other objectionable deformations of the conduit occur.

The general object of this invention is to provide an apparatus for reshaping conduit with a minimum amount of distortion due to the reshaping operation.

A further object of this invention is to provide an apparatus for avoiding distortions attendant to conduit reshaping operations in a simple, efficient, and economical manner.

The aforesaid objects of the invention, and other objects which will become apparent as the description proceeds, are achieved by inserting an internal supporting member into the conduit section to be reshaped. The conduit is then reshaped without resulting distortions and at the conclusion of the operation the supporting member is withdrawn and can be reused for further operations. This internal supporting member is formed of a mesh construction in a configuration geometrically similar to the conduit and proportionally sized thereto. The mesh may be composed of interwoven or braided lengths of wire, tape, ribbon, etc., of a type possessing high inherent elasticity, such as tempered metal and the like which is longitudinally substantially incompressible; the whole defining a flexible resilient structure that is highly extensible when tension is applied thereto. Under such tension the mesh length elongates with a corresponding decrease in bounded cross-sectional area. In the method of the invention, the mesh length is first elongated by the application thereto of a lengthwise tensioning force, then positioned within the conduit, and after which the tensioning force is released. The resiliency of the mesh reacts and tends to contract the mesh length to the original relaxed state; this reaction, however, being restrained by the conduit walls. The net result is that the mesh exerts an outward radial pressure upon the inner circumferential surface of the conduit and thereby supports, strengthens, and reinforces the conduit during the subsequent reshaping operation, preventing objectional deformations thereof. At the conclusion of the reshaping operation, the tensioning force is again applied and the mesh removed.

In the drawings:
Fig. 1 is a view showing the preliminary step preparatory to inserting the mesh length into a conduit;
Fig. 2 is a cross-sectional view showing the construction of a mesh element;
Fig. 3 is a view showing the mesh length partly inserted into a conduit;
Fig. 4 is a view showing the mesh length finally positioned in the conduit and the whole assembly being heated;
Fig. 5 is a view showing the conduit at the finish of the reshaping operation;
Fig. 6 is a view showing the mesh length partly removed from the conduit; and
Fig. 7 is a view of a mesh formed of flat ribbons.

Fig. 1 shows an internal supporting basket weave mesh 1 of resilient and flexible construction preferably formed of individual wires 2 which are small in diameter and may be of tempered steel, and which are placed side-by-side to form flat bands 3 as shown in Fig. 2. The flat bands 3 are preferably, in turn, braided in the interlaced pattern of Fig. 1 to define the cylindrical form of the mesh 1. At one end of the mesh 1, the flat bands 3 are gathered into a lug plate 4 which has integral therewith an eye-bolt 5. The other end of the mesh 1 may be simply terminated to avoid unravelling, or as shown, a lug plate 6 with an integral eye-bolt 7 may be utilized. A tensioning element such as a cord 8 is suitably fastened to the eye-bolt 5 and is of such length as to pass entirely through and emerge to a working length from a conduit such as a cylindrical tube 9. The outside diameter of the mesh 1, in its relaxed state, is preferably of a size greater than the inside diameter of the conduit 9. As will hereinafter become apparent, the mesh 1 is constructed in such manner as to geometrically correspond to the tube 9; a circular tube demanding a circular mesh, a rectangular tube demanding a rectangular mesh, etc.

Due to the high pitch of the elements forming the basket weave mesh and the reduced diameter of the tool at the ends thereof, the reduction in diameter may be accomplished by application of tension to one end only since the reaction resulting from engagement of the end of the conduit with the mesh will cause reduction in the overall diameter of the helical elements with the consequent reduction in the overall diameter of the mesh progressively as the tool is pulled through the conduit.

As shown in Fig. 1, the cord 8 is first introduced into one end of the tube 9 and passed therethrough with a substantial length of the cord 8 emerging from the other end of the conduit 9. The end of the mesh length 1 engaging the cord 8 is then brought into contact with the end of the conduit 9 wherein entrance is to be made. A tensioning force is subsequently applied to the emergent end of the cord 8 and, as shown in Fig. 3, the interwoven construction of the portion of the mesh length 1 under tension results in a change in angle orientation between the interlaced bands 3 with a consequent elongation and in turn a resulting decrease in bounded cross-sectional area of said mesh portion. Thus, as a result of the constantly applied tensioning force on the cord 8, the mesh length 1 progressively advances into the conduit 9 until the mesh length 1 is suitably positioned in that section of the conduit 9 whereat the reshaping operation is to be performed.

After the mesh length 1 is in a working position within the conduit 9, the tensioning force acting on the cord 8 is released and the mesh length 1 resiliently retracts in length with a consequent increase in overall diameter. Due to the internal diameter of the tube 9 being less than the overall diameter of the mesh member 1 when the member 1 is in a relaxed state, the internal surface of the tube 9 limits the diametral expansion of the mesh member 1; as a result the mesh member 1 exerts an outwardly radial force on the inner surface of the tube 9, thereby acting in a strengthening and reinforcing manner. The small diameter wires 2 forming the bands 3 tend to closely approach the flat contact area of a ribbon or tape element, consequently tending to distribute the above radial forces over a large area and thereby preclude any excessive pressure per unit area which might result in an embedding of the elements of the member 1 into the inner wall of the tube 9 during the reshaping operation. This embedding action is especially troublesome when heat is used to soften the tube 9 in preparation for reshaping, and internal support is being established through the usage of helical coil springs of relatively small wire diameter. The substantially line-contact between such coil springs and the tube wall results in a consequent high pressure per unit area therebetween, thus tending to embed the coils into the inner wall proper, creating considerable difficulty in removal of the supporting member and forming a ridged and roughened inside surface thereby increasing the pressure drop therein under operating conditions.

As this invention does not reside in the details of the reshaping operation proper, only a diagrammatic representation of said operation is herein shown. For purposes of illustration and simplicity in continuity of description, the conduit 9 may be of a heat-shapable material. By heat-shapable it is meant that upon the heating of the conduit 9 to some temperature above normal ambient, the conduit 9 can be plastically deformed by the application thereto of a deforming force such as a bending moment. Consequently, in Fig. 4, heat in the form of banks of radiant heat sources 10, is applied uniformly to that portion of the tube 9 whereat the reshaping operation is to be performed. When the tube 9 has been sufficiently heated, the tube 9 is bent by a suitably applied force. Upon cooling, the tube 9 regains its normal rigidity and the supporting member 1 can then be removed.

Removal of the supporting member 1 is accomplished as shown in Fig. 6 by re-establishing the tensioning force acting on the cord 8, thereby lengthening the supporting member 1 in the manner previously described and permitting removal of the member 1 from the tube 9. The member 1 can then be reused in similar manner for further reshaping operations. If a number of bends are to be made in a long tube length, the member 1 need, of course, not be removed, but simply moved from position to position until all the bends within the entire length are made, whereupon the member 1 is then totally removed from the tube length.

It will be obvious that in some situations a more desirable method of removal can be had by a cord similar to the cord 8 fastened to the eye-bolt 7 and utilized for removal of the member 1 from the same end of the tube 9 whereat entrance was effected. It will also be obvious that the use of the cord 8 and the resulting necessary emergence thereof of a working length of said cord 8 from the opposite extremity of the tube 9 can easily be dispensed with by the provision of other means of tensioning the member 1, as, for example, a flexible push-shaft extending throughout the length of the mesh 1 and suitably engaging one extremity thereof, can be utilized to insert and position the mesh length 1 within the conduit 9. The member 1 may alternatively be pre-tensioned by suitable means and after insertion thereof effected, such pre-tension be removed permitting the member 1 to expand to the desired supporting relationships. A further force may also be applied to the positioned member to place thereon a compression force thus increasing the rigidity and radial outward pressure of the member 1 on the inner surface of the conduit 9.

Fig. 7 shows a constructional variation of the member 1 in that flat metal tape or ribbon 11 is utilized; being interlaced in similar manner to that of the bands 3 of Fig. 1. It will be obvious that not only can the bands 3 of Fig. 1 be replaced with the tapes 11 of Fig. 7, but also that other types of cross-sectional strips can be formed from a wide range of materials and utilized in the method of the invention. The invention is also not limited to the particular type of interweaving of the preferred embodiment described herein; other types and patterns of networks attaining the result of the same resilient retractability as that inherent in the supporting mesh of the invention will be manifest to a competent craftsman.

In order to prevent or minimize the tendency of the wires to embed themselves in the heated tube material, the mesh may also be provided with an expansible cover member which would bridge the spaces between the wires.

While certain representative embodiments and details have been shown for the purpose of illustrating the invention, it will be apparent to those skilled in this art that other various changes and modifications may be made therein without departing from the spirit or scope of the invention.

I claim:

1. A tool for supporting the wall of a conduit while a reshaping operation is performed thereon comprising an elongated member formed of a resilient extensible and flexible mesh constructed of a multiplicity of closely spaced elongated elastic elements of longitudinally substantially incompressible material interwoven in a basket weave in which said elastic elements are in opposed high pitch helical arrangement with the mesh having a relaxed size at least as great as the internal diameter of the conduit to be shaped whereby upon application of axial tension to the member to elongate the member the pitches of the elements are increased with consequent reduction in diameter of the member and relaxation of the tension permits the elements to return toward normal relaxed diameter due to the inherent elasticity thereof to thereby engage and support the wall of said conduit when said tool is arranged therein, the pitch of said helical elements being such as to resist reduction in diameter of said mesh and consequent elongation thereof due to radial pressure exerted thereon while said conduit is being reshaped, and means connected to the ends of the elements for use in the application of axial tension to said elements to reduce the overall diameter of said member in a radial direction to facilitate the insertion of said member in said conduit.

2. A tool as set forth in claim 1 in which said elongated elastic elements comprise flat bands having their greatest width generally parallel to the circumference of said mesh.

3. A tool as claimed in claim 2 in which said flat bands each comprise a plurality of parallel filaments.

4. A tool as set forth in claim 1 in which said elements near their extremities are drawn radially inward to a smaller diameter than the conduit at their point of connection to said means to form end portions of gradually reduced diameters progressively toward the ends for facilitating initial insertion of the end of said tool into said conduit.

References Cited in the file of this patent

UNITED STATES PATENTS

| 423,544 | Vanderman | Mar. 18, 1890 |
| 1,521,789 | Oswald | Jan. 6, 1925 |
| 1,880,053 | Schur et al. | Sept. 27, 1932 |
| 1,945,195 | Kellems | Jan. 30, 1934 |
| 1,949,650 | Lindas | Mar. 6, 1934 |
| 2,491,589 | Slaughter | Dec. 20, 1949 |
| 2,663,904 | Slaughter | Dec. 29, 1953 |
| 2,685,118 | Hunter | Aug. 3, 1954 |